United States Patent [19]

Goodwin

[11] Patent Number: 4,694,853
[45] Date of Patent: Sep. 22, 1987

[54] WAFER CHECK VALVES

[75] Inventor: Richard S. Goodwin, Stoke-On-Trent, England

[73] Assignee: R. Goodwin International Ltd., Hanley-Stoke-On-Trent, England

[21] Appl. No.: 729,741

[22] Filed: May 2, 1985

[30] Foreign Application Priority Data

May 2, 1984 [GB] United Kingdom ................. 8411255
Feb. 6, 1985 [GB] United Kingdom ................. 8503035

[51] Int. Cl.⁴ ............................................ F16K 15/03
[52] U.S. Cl. .............................. 137/512.1; 137/527.2
[58] Field of Search ............... 137/454.2, 454.6, 512.1, 137/527, 527.2, 527.8

[56] References Cited

U.S. PATENT DOCUMENTS

| | | | |
|---|---|---|---|
| 3,074,427 | 1/1963 | Wheeler, Jr. ...................... | 137/454.2 |
| 3,208,472 | 9/1965 | Scaramucci ....................... | 137/454.2 |
| 3,678,958 | 7/1972 | Satterwhite et al. ............. | 137/512.1 |
| 3,831,628 | 8/1974 | Kintner et al. ................... | 137/515.7 |
| 3,933,173 | 1/1976 | Kajita ................................ | 137/527.8 |
| 4,201,241 | 5/1980 | Schertler ......................... | 137/454.2 |
| 4,257,444 | 3/1981 | Ogle, Jr. et al. ................. | 137/454.2 |
| 4,257,451 | 3/1981 | Paton ................................ | 13/512.1 |
| 4,321,944 | 3/1982 | Schutzer .......................... | 137/512.1 |

Primary Examiner—Alan Cohan
Assistant Examiner—John A. Rivell
Attorney, Agent, or Firm—Fleit, Jacobson, Cohn & Price

[57] ABSTRACT

A wafer check valve having an annular housing, closing flaps effective to close a passage through the housing and spring urged to a passage closing position, the flaps being mounted on one or more hinge pins, the or each hinge pin extending at each end into a bore in an insert, the inserts being received in respective slots in the body and including means retaining the inserts in the slots without movement.

2 Claims, 16 Drawing Figures

WAFER CHECK VALVES

This invention relates to wafer check valves.

FIGS. 1A and B of the accompanying drawings are an end and horizontal sectional view of a known wafer check valve. This comprises an annular housing 10 with two substantially semi-circular valve members or flaps 11,12 pivotally mounted on a diametral hinge pin 13. These members can take up a valve closing position in which they shut respective semi-circular apertures defined at one end of the housing by a diametral cross piece 14. The members are spring urged towards the closing position but they can also move to an open position in which they generally lie parallel to the housing axis. Each member preferably has a shock bumper in the form of a lug 15 projecting from its rear i.e. the side which does not contact the valve seats surrounding the semi-circular openings. However, there is also a stop pin parallel to the hinge pin. This prevents either flap from pivoting more than 90° from the valve closing position.

Wafer check valves are essentially non-return valves which open in response to pressure of a given level on the upstream side, that is pressure applied to the semi-circular openings. If the flow rate drops, the spring controlling the flaps will tend to shut the flaps as the fluid flow declines and when the flow ceases altogether, an automatic closing occurs, without in general any slamming or hammering of the flaps on the housing.

The hinge and stop pins 13,16 are both normally fixed into the housing 10 by being inserted through holes bored in the housing and then retained therein by means of screwed plugs 17 applied from outside the housing. A requirement is that the screw plugs should permit easy disassembly so that internal parts such as the pin itself, the flaps and the spring can readily be replaced as required. However, these plugs have in the past caused some difficulty, for instance vibration can, over a long period, render them loose and thus allow leakage, and differential thermal expansion and contraction may also loosen them. Leakage may also arise due to the plug threads being differentially attacked in corrosive situations leading to local corrosion and eventually leakage and loosening of the plugs.

As shown in FIG. 1, the known valve is of sandwich type, to be held between two flanges by long bolts, but also well known are valves of the lug type, having lugs extending outwards at one or both ends. Particularly with the former type of valve the screw plugs 17 can interfere with the fixing bolts.

In an effort to overcome the above leakage difficulties it has been occasional practice to create a welded seal around the plug where it projects out of the housing or completely to encase the plug in a weld but this involves additional initial work and complicates the task of disassembly.

The prior art also includes British Patent Specification No. 1 314 509, in which the hinge pin for the closing flaps is mounted with its ends inserted into shaft guides which are movable parallel to the axis of the valve. These shaft guides are retained in the valve body in one of a plurality of suggested ways, each allowing them to slide to and fro, the purpose being that on opening of the flaps they lift off their seatings all round and then pivot open. This avoids scuffing the seals at the seatings. However, such a construction has the drawback that wear will occur on both the shaft guides and valve body; both of which are expensive to maintain, replace, or overhaul when wear becomes excessive. Also, several proposed embodiments do not securely locate all parts of the shaft fixing arrangement within the valve body. There is a danger that, on failure, parts will fall into the pipeline in which the valve is located.

The art also includes U.S. Pat. No. 3 023 771 in which the flap hinge pin is held in an annular insert received in the valve body and retained therein by a covering ring. Although this reduces the potential leakage problems described above, it is expensive and rather cumbersome and there is still a potential leakage path from the interior round the outside of the annular insert and between the valve body and covering ring. U.S. Pat. No. 3 208 472 has somewhat similar disclosure attracting the same comments.

Accordingly, there is a need for a wafer check valve in which easy assembly and disassembly are available without aggravating or introducing problems such as those mentioned above.

According to the present invention, there is provided a wafer check valve having an annular housing, closing flaps effective to close a passage through the housing and spring urged to a passage closing position, the flaps being mounted on one or more hinge pins, the or each hinge pin extending at each end into a bore in an insert, the inserts being received in respective slots in the body and including means retaining the inserts in the slots without movement.

In certain preferred embodiments, the inserts are retained by a ring which extends into a groove at the end of the body, from which groove said slots extend. In such cases, the zone of abutment between ring and body can be open to the outside of the valve or into the end face thereof with the ring being of less diameter than the valve body.

Alternatively, the inserts are retained by bolts passing through them directly into the body of the valve. The bolt heads can be so located as to be covered by the gasket in order to ensure that they remain in position. As a further alternative, the inserts are retained by spacers located between the inserts and the end of the slots and retained in the slots which are blind or partially blind. The spacers can be retained by a locking action involving, for instance, circlips either on the stop pin or the body. Alternatively, the spacers can be spring urged outwardly, into the slots, by springs on the stop pin.

Preferably, both flaps are mounted on the same hinge pin. In most embodiments there will, in addition to the hinge pin, be a stop pin which can be mounted in the same way in the same or additional inserts. The inserts are received in appropriate slots formed at the interior of the annular housing. The slots may be part circular in cross section and the inserts shaped correspondingly, having transverse bores to receive the end of the hinge and, where provided, stop pins.

If a ring is used to retain the inserts in position in the housing, it may be L-shaped in cross-section having a radial dimension, that is the difference between its outer and inner diameters, substantially as large as the normal thickness of the wall of the housing. With this arrangement, when the valve is inserted in a pipeline a full face is provided on the ring to be available for forming a seal. The seal between the ring and the main part of the housing may be by a resilient O-ring, by a metallic O-ring particularly when fire resistance is important, or if very high pressures are involved, by a spiral wound gasket. A large part of the force between the ring and the main part of the housing will come about in use, when the valve is clamped between flanges into position. For assembly purposes two screws located in recesses in the face of the ring, preferably at a radial outward part thereof, may be employed.

Such a construction does provide a potential leakage path from the inside to the outside of the valve through the zone of abutment between the body and the ring. No practical difficulty with effectively sealing this gap is expected, but alternative arrangements without this feature may in some circumstances appear desirable.

Accordingly, in alternative embodiments, the ring is of less radius than the external radius of the body, so that the zone of abutment between the ring and the body is always radially inwards of the edge of the body. In particular, it is envisaged that the zone will usually end in one of the end faces of the valve at a line of contact which in all cases presently envisaged will be circular.

Various factors affect the preferred positioning of that line of contact across the width of the end face, but in general it should be such that the amount of gasket outwards of the line of contact when the valve is installed is sufficient to seal the valve at test pressure. If the line of contact is too close to the inner edge of the end face, the chance that the gasket will not cover the junction is increased. This would be disadvantageous, as the gasket would be more liable to distort and the ring would not be evenly compressed via the gasket.

Although the ring may be held in the body by snap fitting or by being threaded and screwed in, it is preferably held in the body by screws extending parallel to the axis of the body, so that the whole assembly of pins and flaps is firmly held in place prior to installation. In such a case, it is desirable that the gasket should also cover at least part of the heads of the screws, in order to provide security against these shaking loose in use under extreme vibration, and falling out. For this reason the screws cannot be right at the innermost edge of the ring, where they might not be covered by the gasket. The gasket will probably have inner and outer diameters respectively greater and less than the inner and outer diameters of the end face.

On the other hand, the line of contact must not be radially outwards of the range of positions of the gasket, and the situation should be such as to allow adequate thickness of the outer wall of the body outboard of the ring in order to preserve strength.

While the ring can have any cross sectional shape, it is preferably wedge shaped in cross-section, having a wide end which when installed forms part of the end face of the valve, and narrowing inwards of the valve body.

With these embodiments therefore, whilst a seal could be used, there is no need for such a seal in the zone of contact between the ring and the body. In the event of leakage through the zone, the leakage path will end at the gasket, or inwards thereof.

In some embodiments, the inserts are retained in position by reason of the slots in which they are located being blind. In such a case, the pins can comprise two telescoped parts, relatively movable by being screw threaded together, or by being slidable and spring-urged to an extended state. Another possibility involves inserts to be put in position to wedge the ends of the pin in the slots after location of the pin therein. The inserts of these embodiments are desirably generally spherical, as the ends of the blind slots will normally have that shape as a result of machining.

With these possibilities, the theoretically potential leakage path between the ring and the body is eliminated or terminates at or inboard of the gasket contact area of the end flange. The gasket contact area, and the main body wall width outboard of the ring, can still comply with current codes regarding pressure vessel wall thickness and have the necessary minimum contact width to avoid degradation of the seal. On the other hand, the combined body and ring end face width can be sufficiently small for the application of a sufficient compressive force upon the gasket for normal bolt loads. Further, there are no local areas of the gasket without support, which could lead to distortion and failure.

With the invention, manufacture and maintenance costs are much reduced because both are exceedingly easy. The slots to receive the inserts can be simply plunge drilled or milled in a simple operation, in the inner wall of the housing, the machining technique used preferably enabling easy inspection and avoidance of stress concentration areas. The inserts themselves are easy to manufacture and there is no particular difficulty regarding the assembly of the inserts and the pins and the valves which can simply be dropped into place within the housing and retained there by for instance the application of the ring, the locking or wedging action or the springs on the spindles. Likewise, repair and replacement are exceedingly easy. Another advantage is that the screw plugs tending to interfere with fixing bolts are removed. Also, the invention in no way hampers, indeed it probably assists, arrangements involving fixing with external lugs because there is no interference of projecting screws. External lugs are preferable insofar as long bolts can be dispensed with. Long bolts are thought likely, in the event of fire, to expand more than the valve does and raise the risk of relaxation of gasket compression. Existing valve body designs and pattern equipment and tooling can be employed and there is very little additional manufacturing cost or increase in weight. Minimum wall thickness criteria can still be met. Nevertheless, those items which do wear internally of the valve, such as the pins, can easily be replaced. Thus at the very least, constructions according to the invention are as strong, more leakproof and very much cheaper to build and maintain than those of the prior art.

The invention will be more clearly understood from the following description which is given by way of example only with reference to the accompanying drawings, in which:-

FIGS. 1A and 1B as previously described, includes views of a known wafer check valve;

Figure 1:
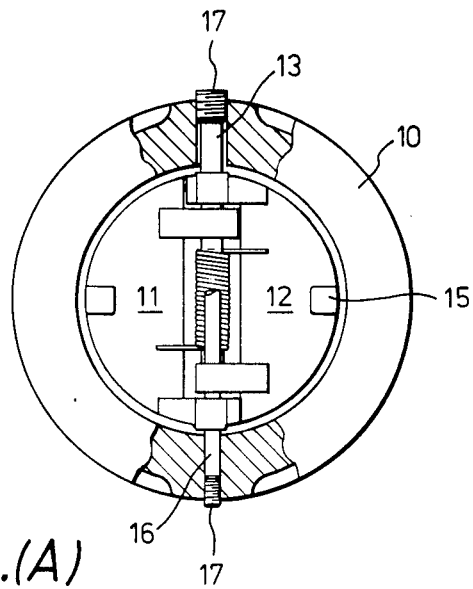
Figure 1:
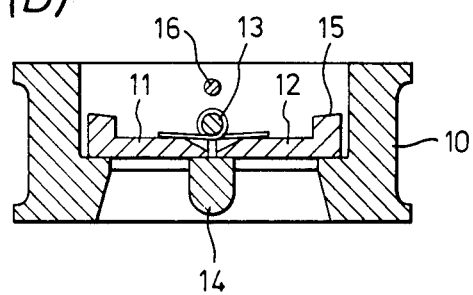
Figure 2:
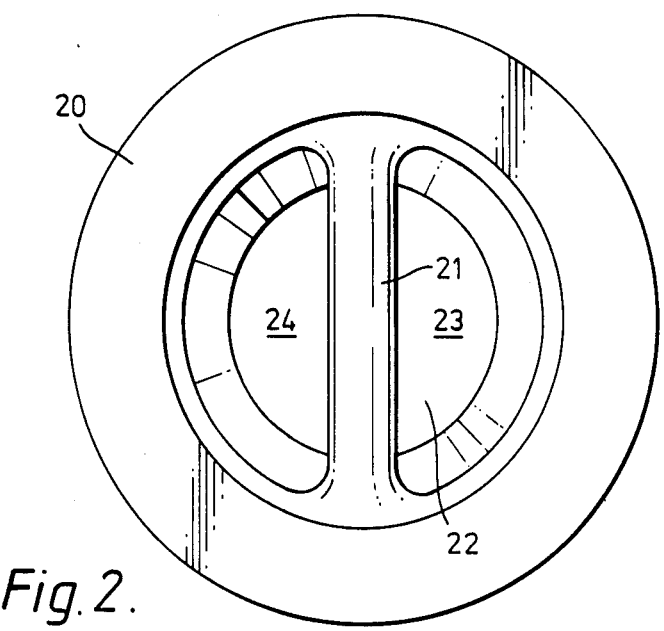
FIG. 2 is a front view of a valve according to the invention.
Figure 3:
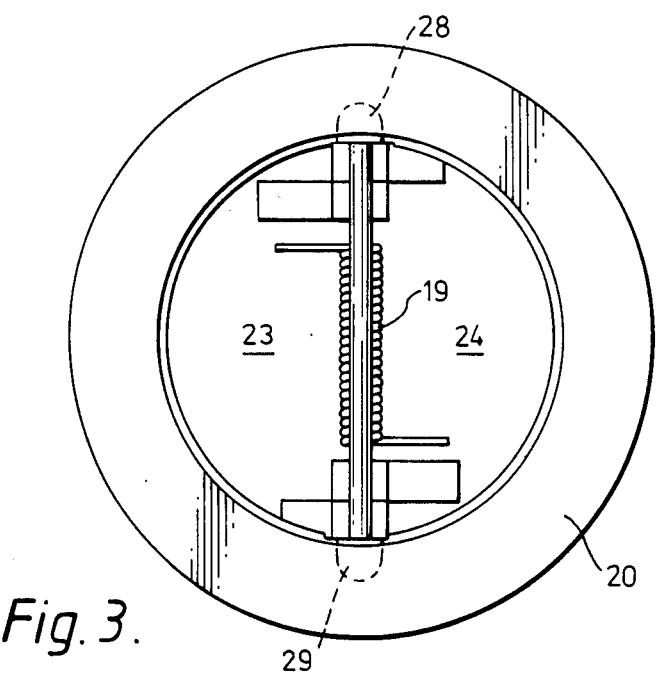
FIG. 3 is a rear view of the valve of FIG. 2.

As shown in FIGS. 2 to 10 the valve of the invention has an annular housing 20 with a diametral post 21 extending across an inlet 22 which in this case is tapered. For closing the valve, there are two flaps 23 and 24 mounted on a single hinge pin 25. These flaps can seat so as to close two semi-circular openings defined by the cross member. Seats surround the annular opening and extend across the cross-member against which these flaps can rest and against which they are urged by springs 19. The hinge pin is slightly downstream of the flaps when in their closed position and the flaps have lugs at their rear sides through which the hinge pin passes. Downstream of the hinge pin is a stop pin 26 which is positioned to prevent excessive rotation of either flap from the closed position towards the open position, in which the flaps are generally parallel to the axis of the housing.

Two inserts 28 and 29, which in cross section in this embodiment are generally semi-circular, are received in open sided bores or slots formed in the inner wall of the annular housing. Each insert has two transverse bores. The hinge pin and stop pins are respectively received in these bores, after which, on assembly the inserts are slid into the open sided recesses so as accurately, simply and securely to locate the pin amongst the flaps in position within the housing.

Figure 4:
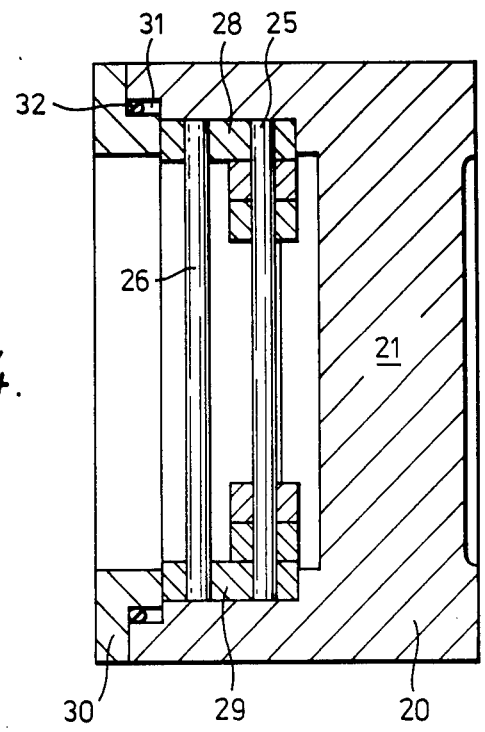
FIGS. 4 to 10 are sectional views of the valve of FIGS. 2 and 3 and of modified valves.
Figure 5:
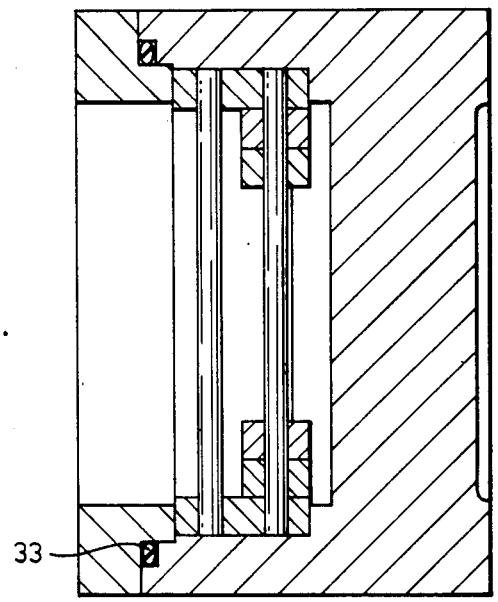
Figure 6:
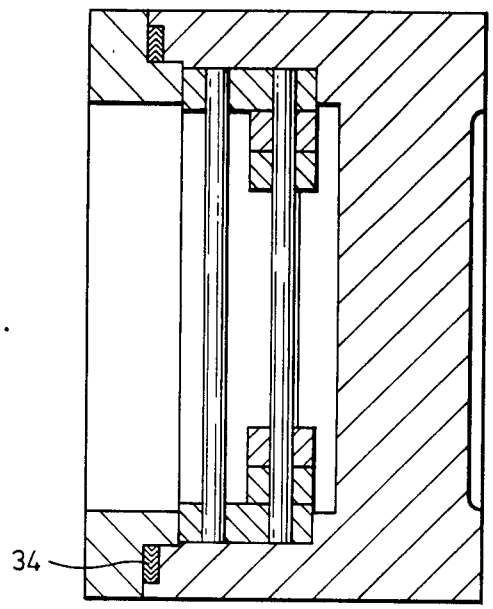

In FIGS. 4 to 6, the inserts are retained in position by an end ring 30 which in cross section is L-shaped, with one arm offering an annular end face which is continuous and of such a width as the other annular end face of the housing so as to allow adequate seals to be formed with flanges of adjacent pipes. The other arm of the cross section extends parallel to the housing axis and secures the inserts in place. Between the outside of this, and a step in the housing, is formed an annular gap 31. This gap takes slightly different forms as can be seen in FIGS. 4, 5, and 6 and accommodates alternative sealing means.

In FIG. 4 the seal is provided by a resilient O-ring 32 located in the gap 31 which here is slightly axially elongated. In FIG. 5 a metallic O-ring 33 is located in a smaller gap. In FIG. 6 a spiral wound gasket 34, adapted to increase the sealing effect if pressure is applied to it from the inside, is accommodated in a gap which has a larger radial dimension than in the other embodiments.

It can be seen that any leakage out of the valve would have to be through the gap between the end ring and the housing body. A selected one of the types of seal described could, however, adequately prevent such leakage and in practice will be able to offer far better resistance to leakage than was experienced with the prior constructions.

Assembly screws may be provided at the outer edge of the flange in FIGS. 4 to 6 but if this were not satisfactory and a further area were required they could with somewhat greater expense be formed on ears radially outwardly of the main part of the housing. Resistance to thermal cycling is much improved, relative to the prior known constructions.

Figure 7:
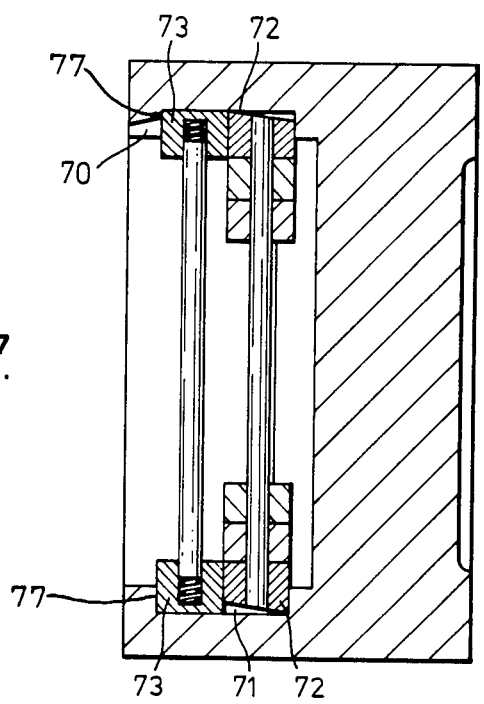

The FIG. 7 embodiment is slightly different because there is no separate ring. Instead, slots with blind ends, such as upper slot 70 which increases in depth away from the rear end of the body are machined into the body. There are separate inserts for the hinge and stop pins at each end thereof. The hinge pin inserts, 72, are bevelled as shown in FIG. 7, and arranged so that when the lower one is placed in the closed slot 71 the upper end can be pivotted into the upper slot 70. Then, the stop pin can be inserted. This has its ends received in blind bores in inserts 73, with springs urging the inserts outwardly. The springs are compressed, the inserts placed in respective slots and then released to secure the stop pin in position. Each insert 73 is retained by a radial step 77 in the inner wall of the housing, at the end of slot 71 and in the length of slot 70. Inserts 73 in effect act as spacers, holding inserts 72 without movement in the slots. They would perform this function even were there no stop pin.

Figure 8A:
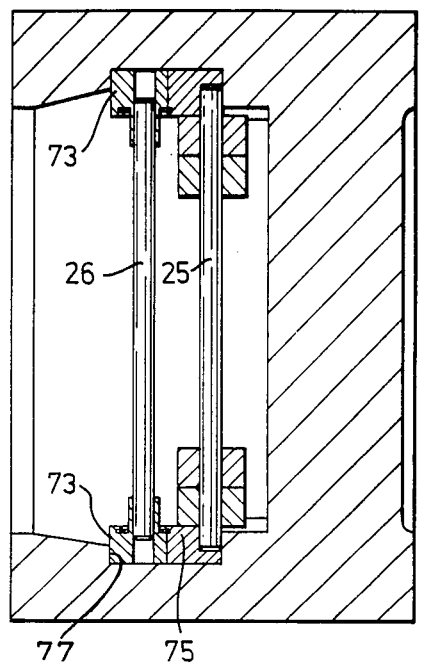
Figure 8B:
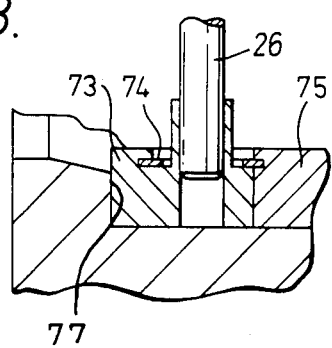

FIG. 8A, and FIG. 8B which is a detail of it, show an embodiment modified as follows. The inserts or spacers 73 for the stop pin are retained differently in the slots. Instead of blind bores they have through bores. The spacers can be slid along the pin away from its ends for the purpose of locating the pins in position. Once the hinge pin is located, the spacers 73 can be moved outwards and located in the slots. They can then be retained by an internal circlip 74, received in a recess 76 which at one side is bounded by the side wall of a modified insert 75 for retaining the hinge pin. The insert 75 has an edge groove rather than a bore, and so the end of the hinge pin can first be placed in the body, with its ends a loose fit in the grooves therein, and the inserts 75 can be positioned very easily in the grooves afterwards to locate the hinge pin. Thereafter, the stop pin and spacers 73 are inserted in the body, the spacers are moved outwards to the grooves and the circlips inserted, again to secure a wedging action with the insert 72 held immovable.

Figure 9:
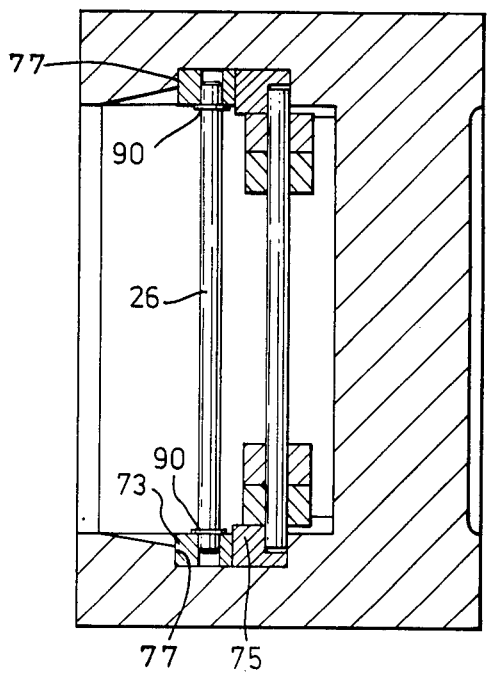

FIG. 9 shows a similar modification, differing in this case in relying simply on circlips or self locking clips 90 surrounding the stop pin 26 to keep the spacers 73 located outwardly in the grooves in the interior of the body.

Figure 10:
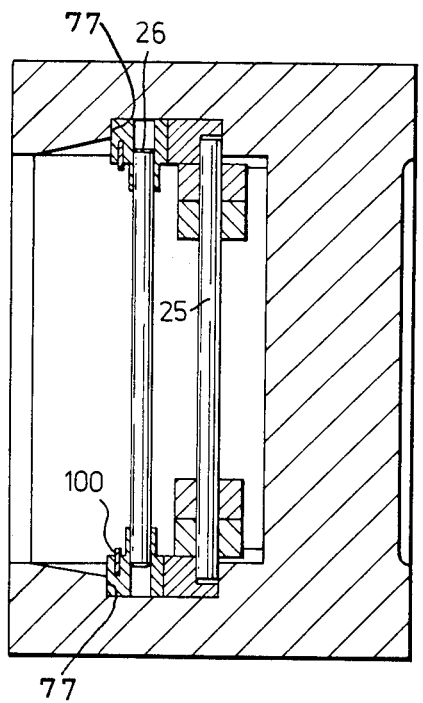

FIG. 10 shows another similar modification. In this case there is a single circlip at 100 coaxial with the body and acting radially outwardly on the inserts. This embodiment is suited to small bore valves.

The embodiments of FIGS. 7 to 10 have the advantage of eliminating leakage paths from inside to outside the housing body.

Figure 11:
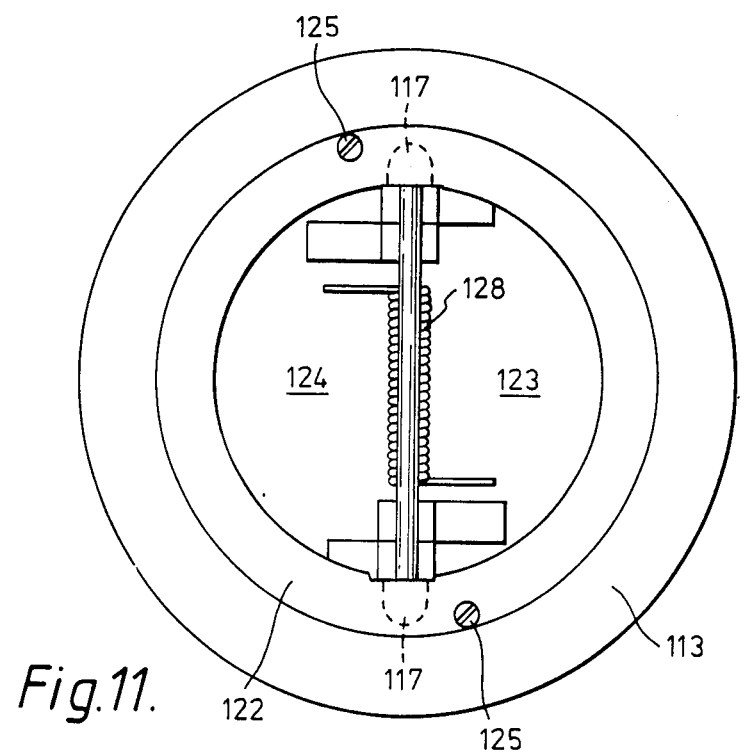
FIG. 11 is a view similar to FIG. 3, being an end view of a valve of the invention.
Figure 12:
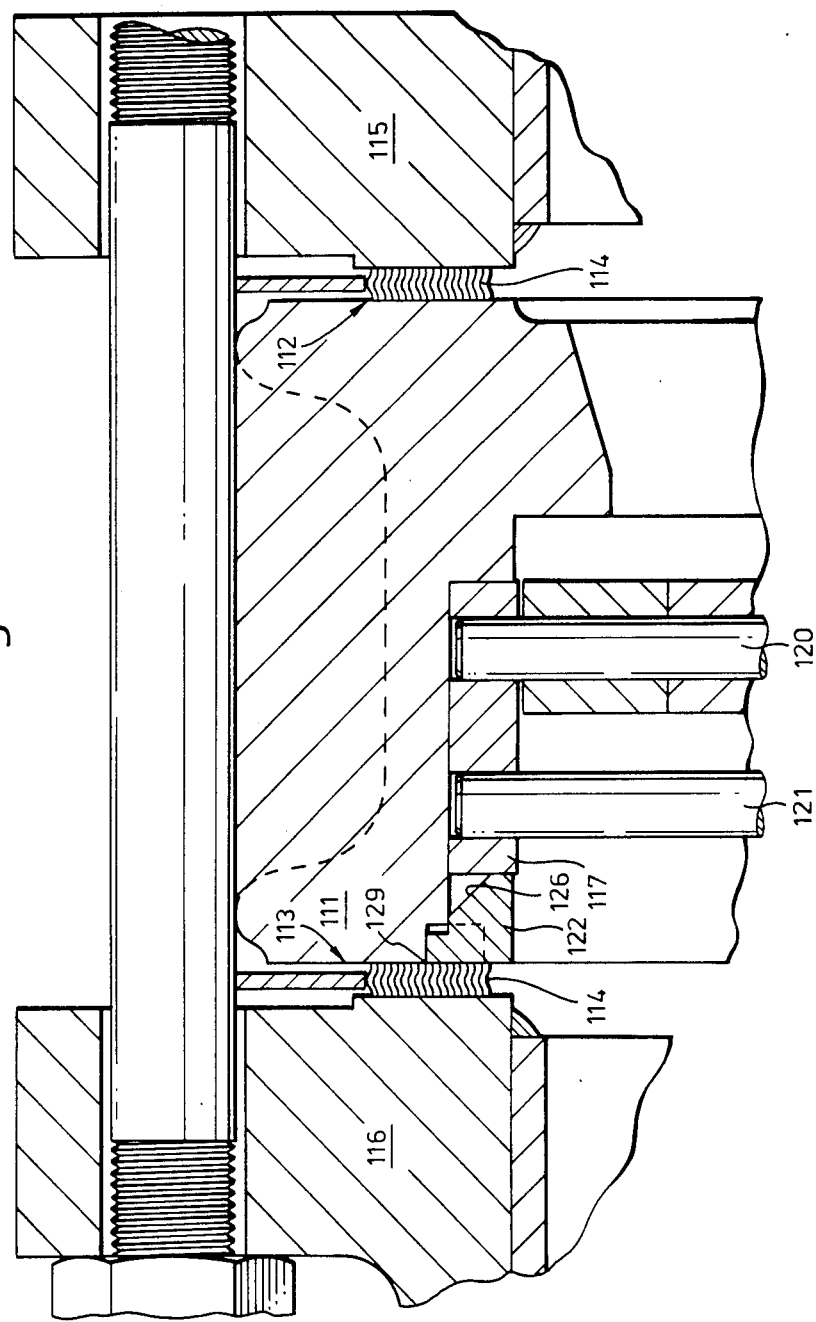
FIG. 12 is a partial sectional view of a valve like that shown in FIG. 11 shown clamped between flanges of adjacent pipework.

As shown in FIGS. 11 and 12 the valve has a valve body 111, having an upstream end face 112 and a downstream face 113. It is clamped, with interposed gaskets 114, between flanges 115 and 116 which are bolted together. There are two inserts 117 generally received in milled section bores in the inside of the valve. As shown, they conform substantially to a sector of a circle; this is for convenience of machining and other shapes may be utilised if desired. The ends of a pin 120 for the flaps 123 and 124, which are loaded by spring 128, and a stop pin 121, are received in bores in the inserts. The inserts are retained in position by a ring 122 which is of generally wedge shape cross-section. It fits in a corresponding groove in the end of the interior of the valve body and is held therein by two diametrically opposed countersunk screws 125. The inclined wedge face 126 of the ring, and thus its seating in the body, is provided so that the distance between that seating and the exterior of the valve is not reduced more than necessary, such as would, for instance, be the case were the valve of rectangular cross-section. As shown in FIG. 12, the junction zone between the ring and the valve body terminates at 129 in the end face 113 in about the central part of the gasket. In the unlikely event of any leakage between the ring and the body, the leakage path is securely blocked by a gasket.

Figure 13:
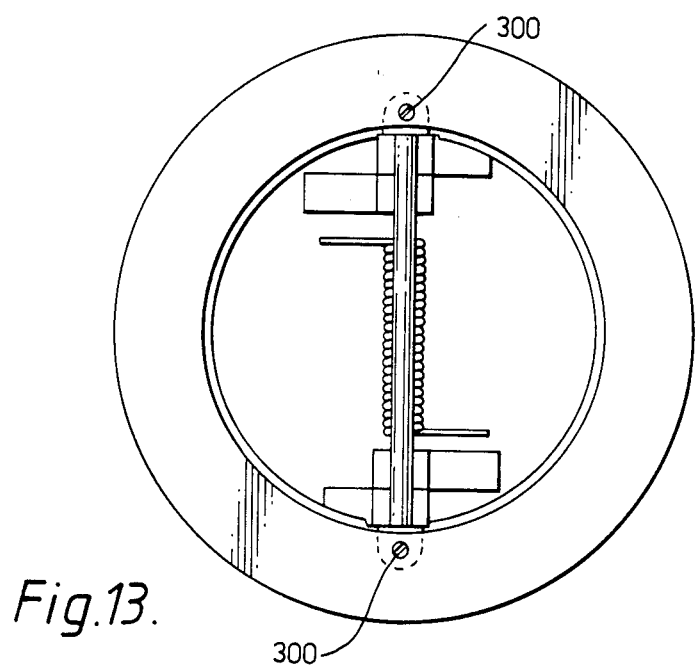
FIG. 13 is a view similar to FIG. 11 of an alternative arrangement.

In the alternative of FIG. 13 the difference is that the inserts here shown at 300 are simply held in the valve body by screws passing through them parallel to the valve body axis.

These screws are arranged so that failure of the fixing will not enable parts to travel down the pipeline or cause leakage and also the inserts will not thereby be loosened because they will still be clamped against movement by the adjacent gasket so that failure will not lead to gasket degradation and leakage.

Figure 14:
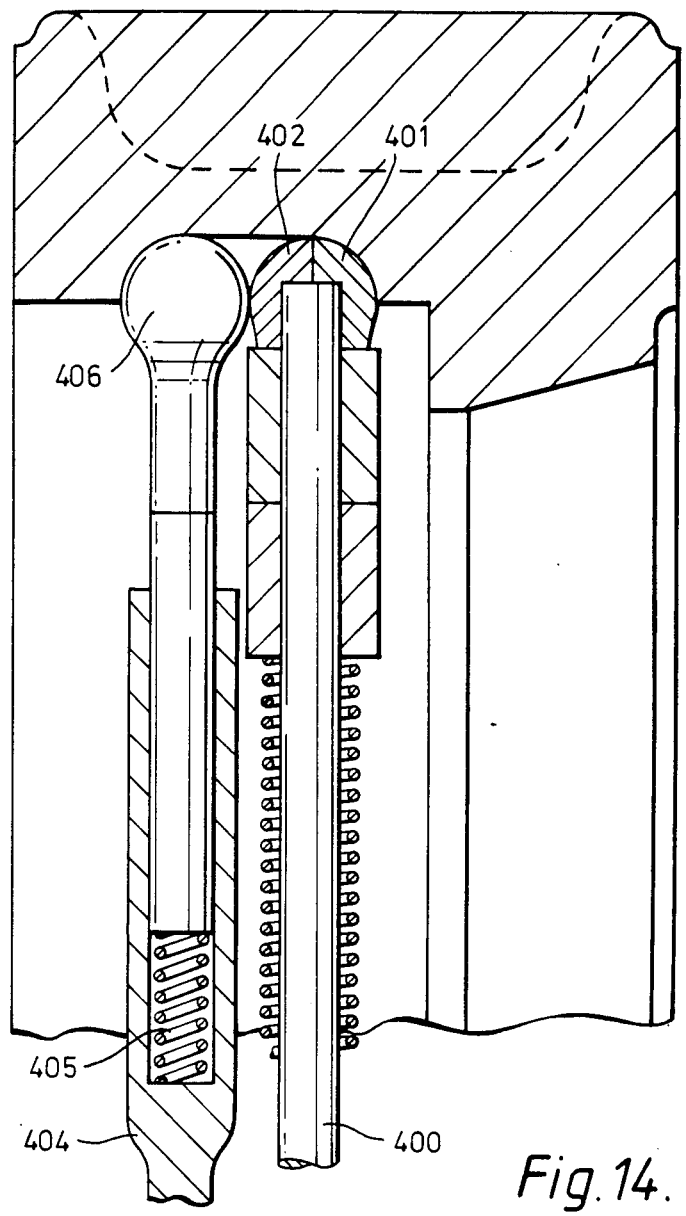
FIG. 14 is a partial sectional view of a valve according to the invention with an alternative means of locating the pins in position.

Another embodiment, in which there is again no ring, is partially illustrated in FIG. 14. In this case, there is for the hinge pin here shown at 400 a rigidly fixed insert which is in two parts with a plane of separation co-incident with the axis of the pin. Together, the parts 401 and 402 form a generally spherical insert, matching the end of the groove which is machined on the inside of the valve body. In assembly, the upstream part 401 is positioned, followed by the pin 400 and flaps, and then the part 402. This insert could be retained by various wedging means but in particular by wedging inserts for the stop pin arrangement such as shown in for instance FIGS. 7 to 10. As shown, however, an alternative stop pin arrangement, which could itself be used with the hinge pin arrangements of FIGS. 7 to 10, involves a telescoping two part pin 404 urged by spring 405 to an extended condition and having spherical ends 406, preferably, again to seat in the machined slots. Alternatively there could be a screw-threaded connection between the two parts. As a further alternative, the stop pin and wedging inserts or members at its ends could be shrink fitted into place.

A further possibility, is to include bushes within the inserts in which the pins are received, the bushes being of an appropriate material, depending on service conditions.

In all embodiments advantages of ease of assembly and replacement will be clear while again the fact that the construction of the invention is just as strong mechanically as those of the prior art is emphasised. Further, the flange surface at both ends is uninterrupted in many embodiments.

The present invention offers valves which are not only inherently better than those before but also use cheap simple and cost effective machining techniques. Generally, the valves will employ an arrangement wherein there is some play between the hinge pin and insert, as opposed to play between insert and valve body. This reduces wear on sealing surfaces because on opening the inner straight edge of the "D" shaped flaps lift off the seat before pivoting occurs. This can be brought about by providing play as just described and by arranging that the springs act on the flaps sufficiently far from the hinge pin line that the flaps first lift off at their said edges near the hinge, pivoting slightly about the point where they are contacted by the spring. The play between hinge pin and inserts will in due course cause wear. However, it is wear in cheap and easily replaceable parts, not in the valve body itself as in earlier proposals.

I claim:

1. A wafer check valve comprising an annular housing having two end faces, a passage through said housing, said passage comprising, at one section of the housing, two generally semicircular opening, sealing surfaces formed on the housing within said passage around said openings, two closing flaps effective to close respective ones of said openings, spring means to urge said flaps to a passage closing position in contact with said sealing surfaces, diametrically opposed axially extending slots formed in asaaid housing and opening into said passage towards one end face of said housing, an insert received in each of said slots, a radial bore in each insert, said bores opening in said passage, a hinge pin on which said flaps are both pivotally mounted, end portions of said hinge pin being received in each of said bores to mount said hinge pin diametrically in said housing, said hinge pin end portions and said bores being dimensioned to allow limited axial play between said hinge pin and said inserts to facilitate opening and closing of said flaps without any wear on the housing or sealing surfaces, retaining means fixedly securing said inserts in said slots and effective to preclude any axial movement between said inserts and said housing, said retaining means comprising an annular groove formed in said housing, said groove opening into said passage and into said one end face and said slots opening into said annular groove, a retaining ring located in said annular groove and abutting said inserts, means securing said retaining ring against movement to thereby prevent said inserts from moving in said housing, the ring having a smaller outer radius than said one end face whereby the junction between said ring and said one end face is radially inwards of the outer edge of said one end face, whereby upon location of the valve in a pipe system with a flange abutting said one end face a gasket can be located to cover said junction without being subject to localised increased degradation forces.

2. A valve as claimed in claim 1 further comprising screws holding said ring in position in the housing and being positioned to be covered by a gasket between the valve and adjacent pipe work.

* * * * *